(12) United States Patent
Mitchell et al.

(10) Patent No.: US 12,316,088 B2
(45) Date of Patent: May 27, 2025

(54) CONFIGURABLE JUNCTION BOX FOR SURFACE MOUNTABLE CAMERA

(71) Applicant: MOTOROLA SOLUTIONS, INC., Chicago, IL (US)

(72) Inventors: Ross Mitchell, Surrey (CA); Sundeep Mohan, Surrey (CA)

(73) Assignee: MOTOROLA SOLUTIONS INC., Chicago, IL (US)

( * ) Notice: Subject to any disclaimer, the term of this patent is extended or adjusted under 35 U.S.C. 154(b) by 220 days.

(21) Appl. No.: 18/341,333

(22) Filed: Jun. 26, 2023

(65) Prior Publication Data

US 2024/0429693 A1    Dec. 26, 2024

(51) Int. Cl.
*H02G 3/10* (2006.01)
*G03B 17/56* (2021.01)
*H02G 3/08* (2006.01)

(52) U.S. Cl.
CPC .............. *H02G 3/10* (2013.01); *G03B 17/561* (2013.01); *G03B 17/566* (2013.01); *H02G 3/083* (2013.01)

(58) Field of Classification Search
None
See application file for complete search history.

(56) References Cited

U.S. PATENT DOCUMENTS

| | | | |
|---|---|---|---|
| 6,325,654 B1 * | 12/2001 | Kerr, Jr. | F04D 25/088 439/313 |
| 7,462,777 B2 | 12/2008 | Dinh | |
| 7,585,084 B2 | 9/2009 | Kinnune et al. | |
| 7,888,609 B2 | 2/2011 | Bakst et al. | |
| 10,248,008 B2 | 4/2019 | Mitchell et al. | |
| 2018/0203449 A1 * | 7/2018 | Tavares | G03B 29/00 |
| 2019/0086213 A1 * | 3/2019 | Mires | G01S 1/042 |

FOREIGN PATENT DOCUMENTS

EP    1593903 A2 * 11/2005  ............. F16M 11/10

OTHER PUBLICATIONS

The International Search Report and the Written Opinion, corresponding patent application No. PCT/US2024/033191, filed: Jun. 10, 2024, mailed Oct. 25, 2024, all pages.

* cited by examiner

*Primary Examiner* — Krystal Robinson
(74) *Attorney, Agent, or Firm* — Barbara R. Doutre (57) ABSTRACT

A surface mountable camera (1000) includes a junction box (104) and clip (300) that provide for a plurality of selectable mounting positions, each accommodating a hanging camera position. The junction box (104) provides a four-sided interior compartment, wherein at least three side walls of the compartment each include a slot (112) and an anchor feature (114) corresponding to the slot. The clip (300) is configured to interchangeably insert onto any of the three side walls of the junction box. The clip (300) includes an access port (304) formed therein for engaging with the anchor feature (114) of the junction box (104), and the clip includes first and second engagement tabs (302) for engaging into the slot (112) of the junction box (104). Once the clip (300) is anchored to the junction box (104), a camera assembly (200) is pivotably mounted, via a hinged bracket (400), to the clip of the junction box.

20 Claims, 8 Drawing Sheets

Hinge Arm 410

CONFIGURABLE JUNCTION BOX FOR SURFACE MOUNTABLE CAMERA

BACKGROUND

Internet Protocol (IP) cameras are connected to networks via cables that are run into junction boxes where connections are made. Some cameras will locate electronics in the junction box section which provides thermal management advantages, simplifies cable management and helps to reduce the size of the camera body section. Doing this requires that the electronics be mounted in a sealed section of the junction box as IP cameras are often installed outdoors and must endure various weather conditions. It is desirable to minimize the size of the junction box while providing improved mounting options and accessibility.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, there is provided herein a surface mountable camera that includes a junction box and clip that provide for a plurality of selectable mounting positions, each accommodating a hanging camera position. The junction box provides a four-sided interior compartment, wherein at least three sides each include a slot and an anchor feature corresponding to the slot. The clip is configured to interchangeably insert onto any of the three sides of the junction box. The clip includes an access port formed therein for engaging with the anchor feature. The clip further includes first and second engagement tabs for engaging into the slot of the junction box. A camera assembly is pivotably coupled via a hinged bracket to the clip of the junction box.

Example embodiments are herein described with reference to flowchart illustrations and/or block diagrams of methods, apparatus (systems) and computer program products according to example embodiments.

Further advantages and features consistent with this disclosure will be set forth in the following detailed description, with reference to the figures.

Figure 1:
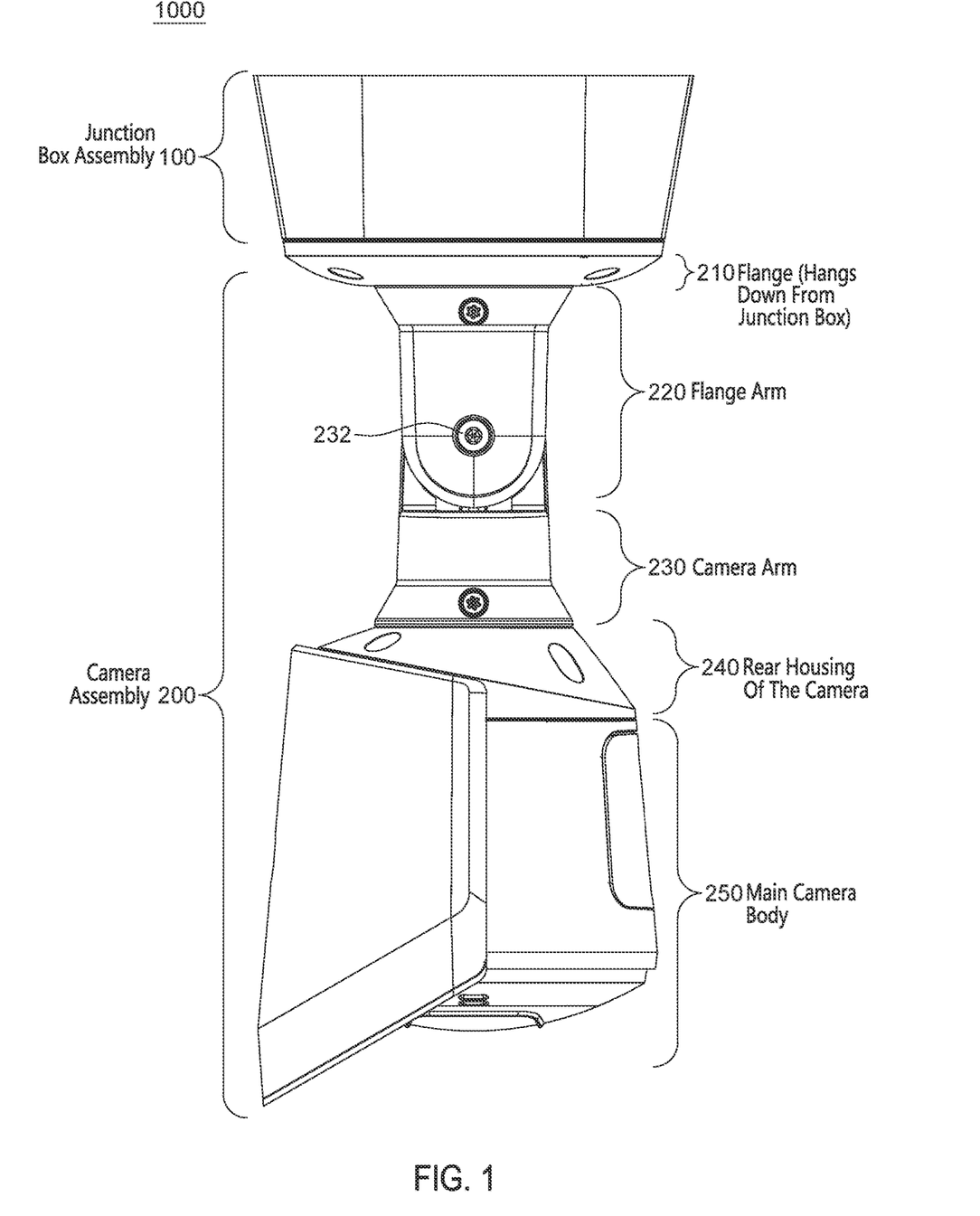
FIG. 1 is a surface mountable camera formed in accordance with some embodiments.

FIG. 1 is a surface mountable camera 1000 formed in accordance with some embodiments. The surface mountable camera 1000 comprises a junction box assembly 100 and a camera assembly 200. The camera assembly 200 comprises a flange 210 coupled to the junction box assembly 100, such as via screw or other interconnect means. A flange arm 220, camera arm 230, rear camera housing 240, and main camera body 250 are coupled in series, via known attachments mechanisms, such as screws, nuts, and inserts to name a few. The flange arm 220 permits pivotal movement via screw 232 of the series coupled camera arm 230, rear camera housing 240, and main camera body 250. The surface mountable camera 100 may be mounted to a wall or ceiling. Adjustment of camera positioning (i.e. series coupled camera arm 230, rear camera housing 240, and main camera body 250) is controlled via the pivotal coupling of flange arm 220.

Figure 2:
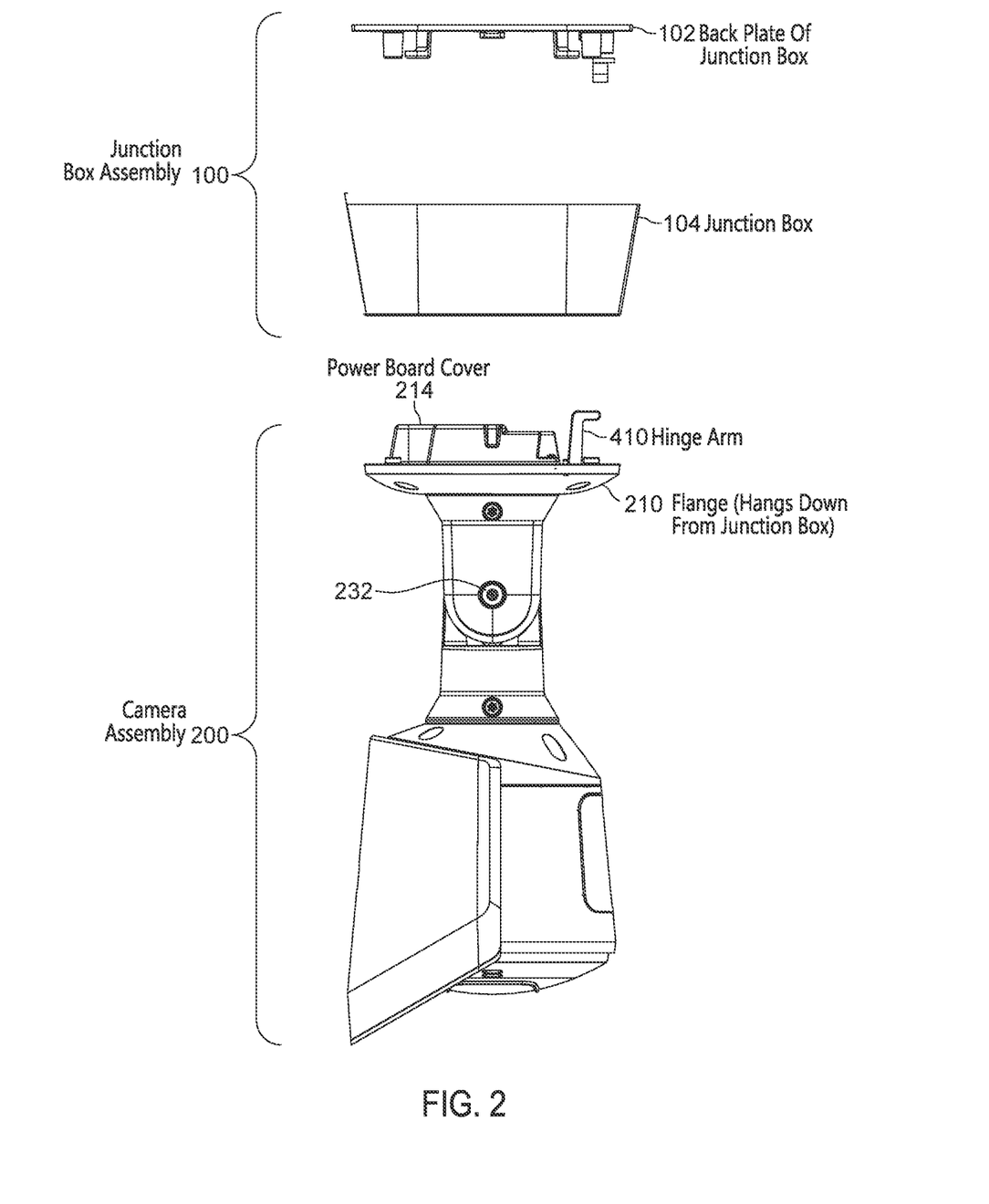
FIG. 2 is an exploded view of the surface mountable camera in accordance with some embodiments.

FIG. 2 is an exploded view of the surface mountable camera of FIG. 1 in accordance with some embodiments. This view shows the junction box assembly 100 as being formed of a mounting plate 102 and junction box 104. The flange 210 of camera assembly 200 comprises a cover 214 for a power board, the power board typically including Ethernet, connectors, connection points and/or circuitry associated therewith. The flange 210 of camera assembly 200 further comprises a hinge bracket having a pair of hinge arms of which hinge arm 410 is shown. When mounting the assembly to a wall or ceiling, the mounting plate 102 is first secured to the surface (wall or ceiling), followed by the junction box 104 being secured to the mounting plate, followed by the camera assembly 200 being coupled to the junction box. As will be described in later views, the junction box 104 includes an insertable clip configured, in accordance with the embodiments, to receive and engage the hinge arms 410. The camera assembly 200 can thus pivotally couple to the junction box 104 via hinge arms 410.

Figure 3:
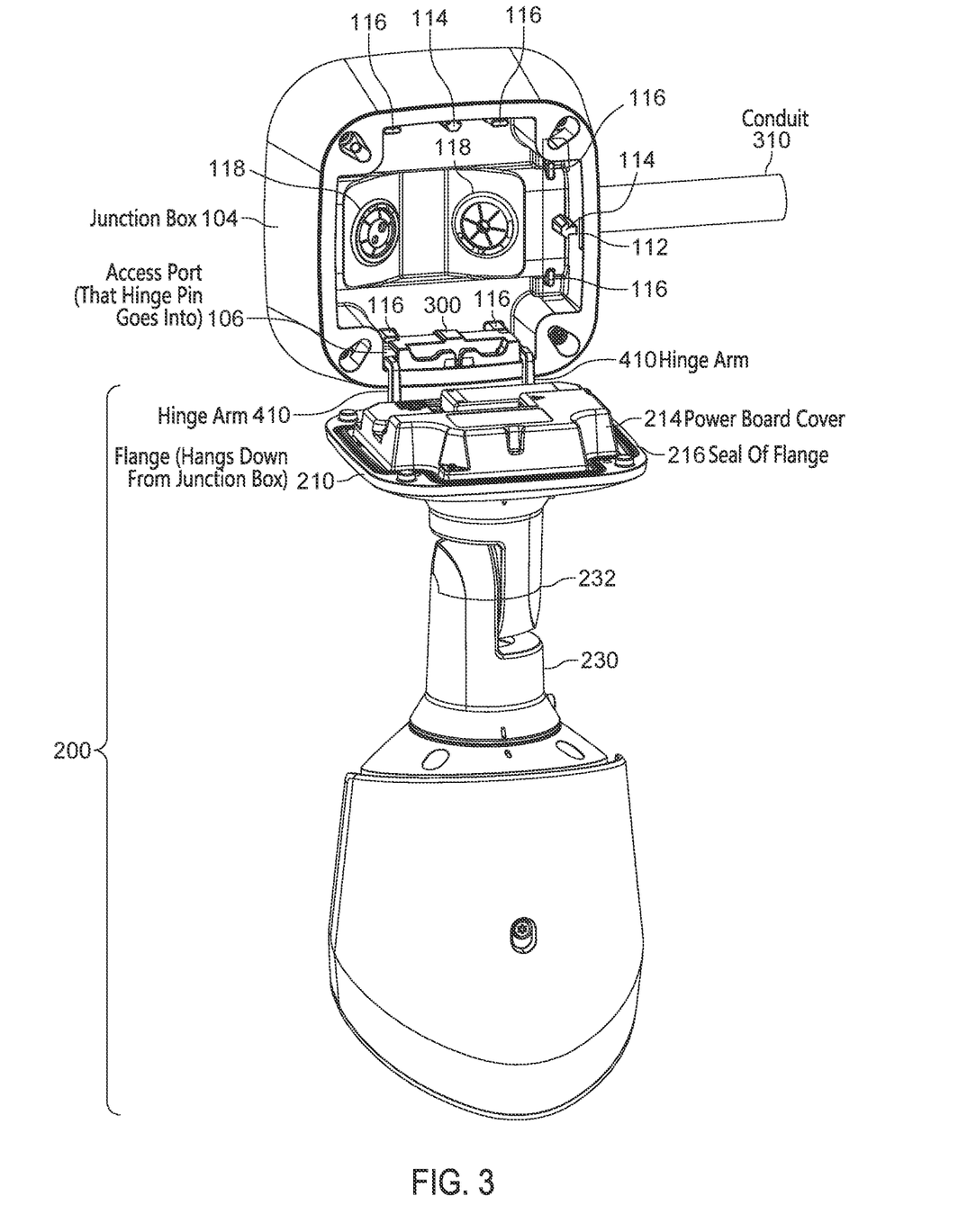
FIG. 3 is a partially assembled view of the surface mountable camera shown with junction box mounted to a surface and camera assembly rotated downward in accordance with some embodiments.

FIG. 3 is a partially assembled view of the surface mountable camera of FIG. 1 shown with junction box 104 oriented for vertical surface mounting, such as to a wall in accordance with some embodiments. This view shows an internal four-sided compartment of the junction box 104 with flange 210 pivotably rotated therefrom. In this view, a clip 300 is shown inserted upon one of three selectable interior side surfaces of the junction box 104. In accordance with some embodiments, three side surfaces of the junction box 104 include a slot 112, an anchor 114, and a pair of backstop features 116 (also referred to as backstops 116). The clip 300 configuration for engagement to the side surface will be described in later views.

Once inserted, the clip 300 and junction box 104 are configured to receive and engage the hinge arms 410 extending therefrom flange 210. In this view, the camera assembly 200 is pivotably rotated downward via hinge arms 410 engaged to clip 300. Cover 214 protects electronic circuitry enclosed therein. A seal 216 surrounds an interior perimeter edge of the flange 210. The seal 216 provides waterproofing protection to the covered electronic circuitry when the flange 210 is secured to the junction box 104. The junction box 104 also provides single entry access for a conduit 310. Interior cables and wires of conduit 310 (not shown) may be pulled through one or more of the grommets 118 for coupling to the power board beneath cover 214 and through to other electronics of the main camera of camera assembly 200. The conduit 310 includes cabling (not shown) for various electronics of the camera assembly 200. This ability to pivot the camera assembly 200 downward provides ease of access to the internal compartment of the junction box as well as access to the covered circuitry on the flange 210. The clip 300, being a separate insertable and removable piece part, beneficially enables the junction box 104 to be oriented in multiple positions using a single conduit entry. As shown in FIG. 3, the camera assembly 200 is pivotably extendable downward from the junction box 104 via the hinge bracket 400 engagement to the clip 300 anchored within the junction box 104. Such a configuration makes the surface mountable camera easy to mount and service by providing a stable hands free platform for making cable connections. Installers often use ladders to install cameras and making connections is much easier using two hands. The improved mounting configuration eliminates having to hold the camera with one hand while making connections with the other. Hands free operation allows an installer to hold onto the ladder with one hand while making a connection thereby providing improved safety. While the junction box has preferably been designed with three selectable anchor surfaces (to avoid a top conduit mounting configuration where water might gather and freeze around the conduit), it is appreciated that a fourth anchor surface could also be used.

Figure 4:
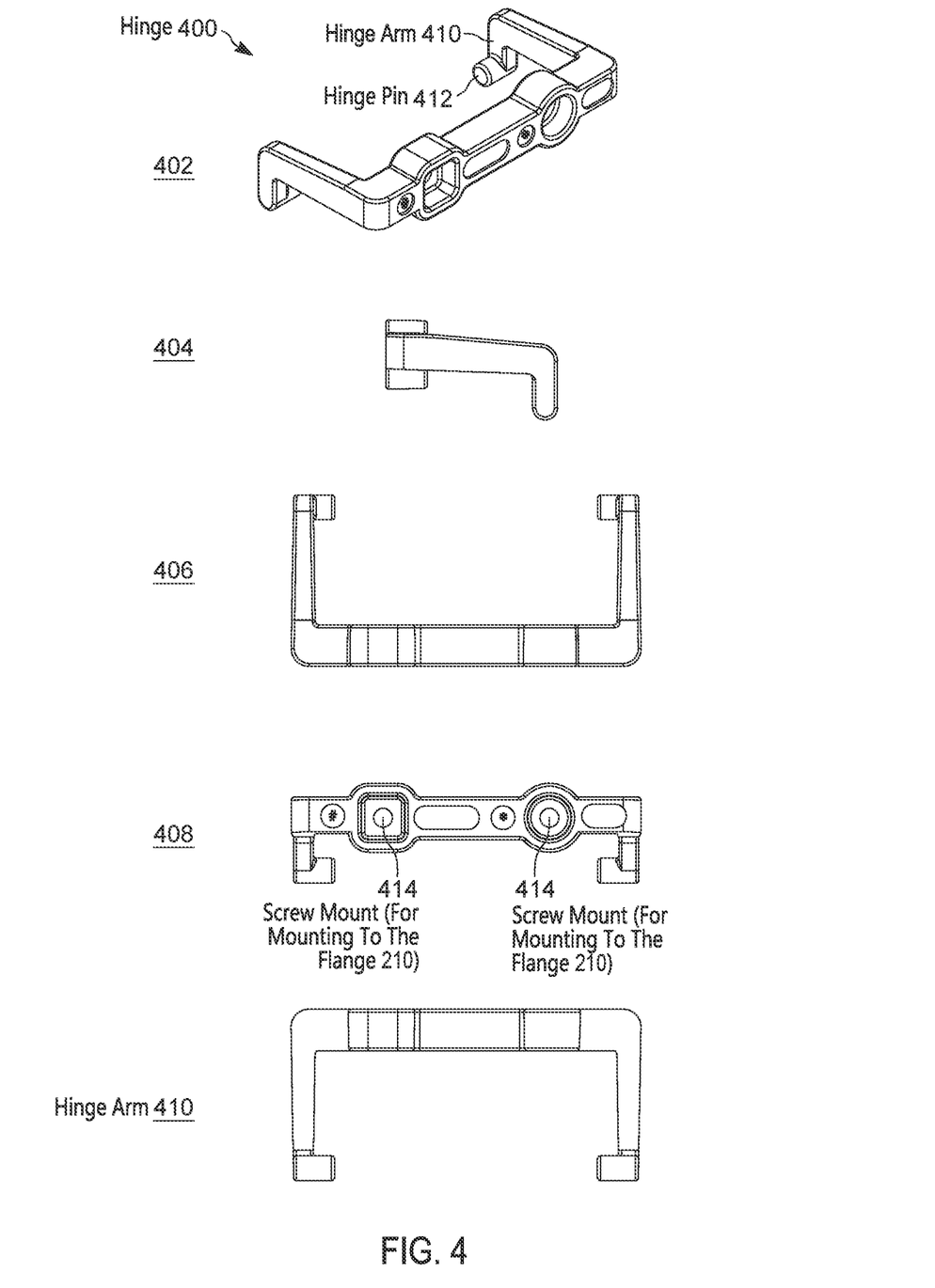
FIG. 4 shows a plurality of views for a hinge bracket of the surface mountable camera in accordance with some embodiments.

FIG. 4 shows a plurality of views of a hinge bracket 400 of the surface mountable camera of FIG. 1 in accordance with some embodiments. View 402 is an isometric view of hinge bracket 400 that includes hinge arms 410, each hinge arm having an engagement pin 412 extending therefrom. View 402 is a side view of the bracket 400, which shows hinge arm(s) 410. Each hinge arm 410 is an L-shaped hinge arm. View 406 is a top view of the bracket 400. View 408 is a front view of the bracket 400, which further shows mounting features 414 (for securing the bracket 400 to an interior surface of the flange 210 as will be shown in later views). View 410 shows a bottom view of bracket 400. The bracket 400 is preferably formed as a unitary piece part. The bracket 400 is preferably made of a hard plastic material that provides sufficient rigidity and strength to hold the weight of the camera assembly 200, when the assembly is pivotably rotated in a downward positon as was shown in FIG. 3.

Figure 5:
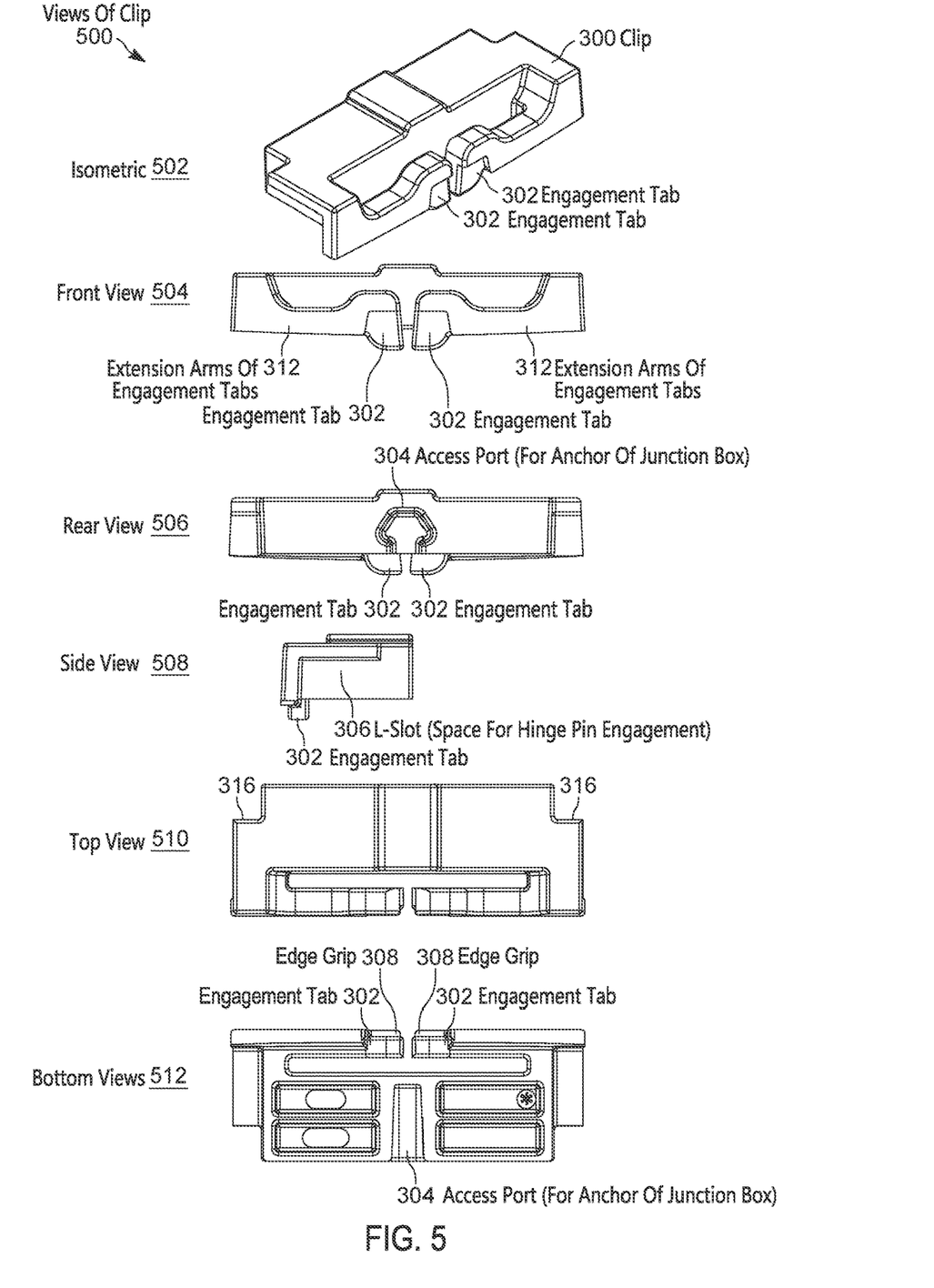
FIG. 5 shows a plurality of views for a clip of the surface mountable camera in accordance with some embodiments.

FIG. 5 shows a plurality of views for the clip 300 of the surface mountable camera of FIG. 1 in accordance with some embodiments. View 502 is an isometric view of clip 300 showing the body of the clip and the engage tabs 302. Clip 300 is preferably formed as a unitary piece part, such as molded of hard plastic. View 504 shows a front view of clip 300 with engagement tab extension arms 312 extending across the front surface towards a center point where the engagement tabs 302 (formed at the end of each arm) face each other. View 506 is a back view of clip 300, which shows an access port 304 (for engaging with an anchor 114 of the junction box as discussed in other views). In this back view 506, a portion of the engagement tabs 302 (located on the front of the clip) are visible. View 508 is a side view of clip 300 that shows the sidewalls of the clip formed as an L-slot slot 306 (the L-shaped sidewalls provide spacing for travel and engagement of hinge pin 412 of hinge bracket 400 shown in other views). View 510 is a top view of clip 300, which shows spacing between the main body of the clip 300 and the extension arms 512. This spacing allows the extension arms 512 to be compressed towards the main body of the clip when pressure is applied to the engagement tabs 302. View 510 also shows cutout features 316 (which will later be shown to abut with corresponding junction box backstops 116). View 512 is a bottom view of clip 300, which shows the access port 304. In accordance with some embodiments, the access port 304 has an expanding draft (e.g. approximately 5 degrees) that tapers from a wider opening to a narrower end wall (to accommodate one of the anchors 114 of the junction box 104 as was shown in FIG. 3). View 512 further shows edge grips 308 extending from the edge of engagement tabs 302. The edge grips 308 may be used to disengage the clip from the slot of the junction box.

Figure 6:
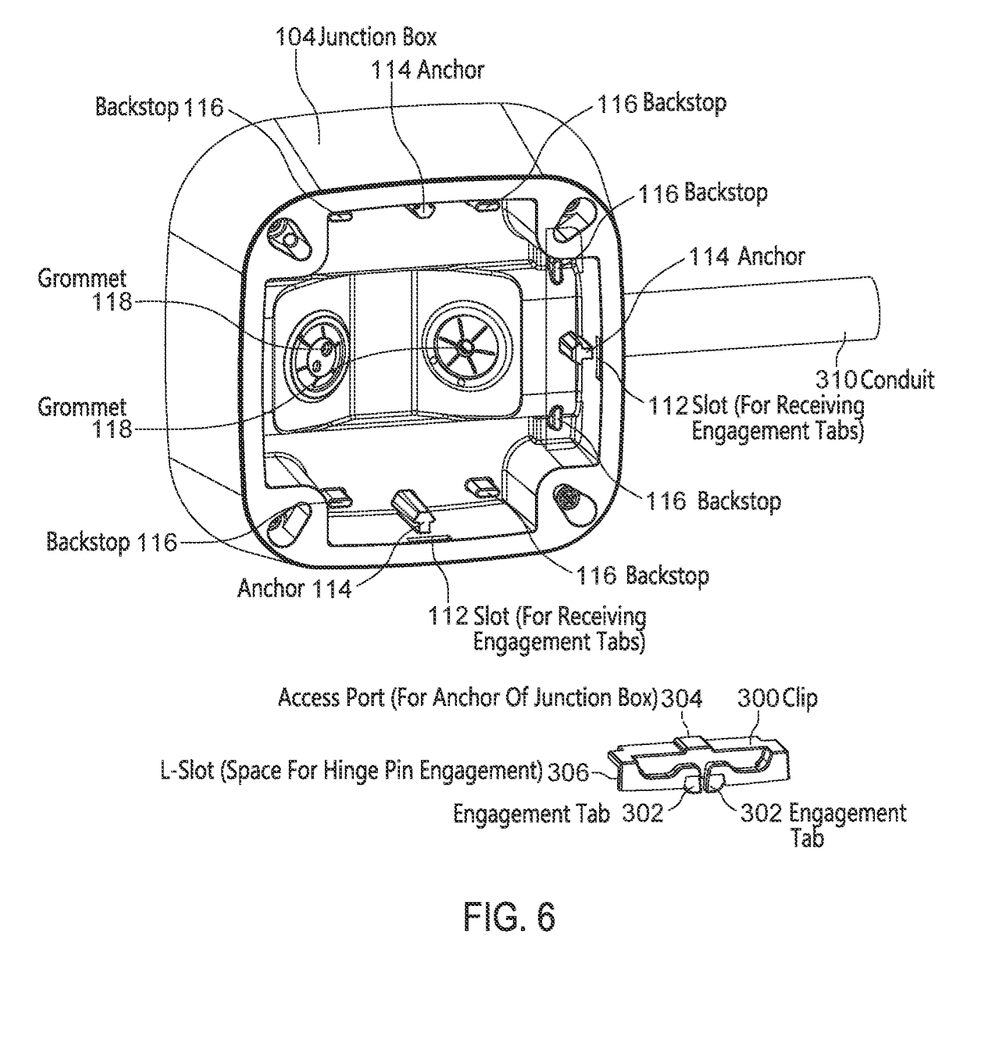
FIG. 6 shows internal components of the junction box with clip removed in accordance with some embodiments.

FIG. 6 shows internal components of the junction box 104 with clip 300 removed in accordance with some embodiments. This view shows the interior compartment of the junction box having three interior side surfaces, which include the clip mounting components including anchor 114, and backstops 118. The anchor 112 is tapered having being smaller at the front and having an expanding draft towards the base of the junction box. The access port 304 of clip 300 has a corresponding draft (as was shown in view 512 of FIG. 5). At initial insertion, the draft on both parts provide sufficient clearance between the anchor 114 and the access port 304 to allow the clip 300 to be positioned so the engagement tabs 302 can easily travel over the wall of the junction box. As the clip 300 is gently pushed onto the anchor, the clearance between the two features is progressively reduced providing a considerable mechanical advantage that deflects the engagement tab extension arms 312 upward until they are free to drop into the provided slot 112 in the junction box 104. At full insertion, the clearance between these two draft features is markedly reduced and the clip 300 is reliably locked onto the anchor with minimal play. The two backstops 116 of junction box 104 align with corresponding cutout features 316 of clip 300 (view 510 of FIG. 5). As the clip 300 is inserted inwardly into the junction box 104, the access port 304 of the clip slides upon the anchor feature 114 of the junction box until the cutout features 316 of the clip 300 abut with the corresponding backstop features 116 of the junction box 104. Abutment of the clip 300 to the backstops 116 aligns and engages the engagement tabs 302 of the clip into the slot 112 of the junction box thereby locking the clip in place.

While clip 300 may be insertable and removable from any of the three interior engagement surfaces, the clip 300 is preferably inserted onto an interior surface which will ensure that the camera assembly (of other views) is positioned to pivotally hang downward during surface mounting of the assembly to a ceiling or wall. Any the selectable interior clip engagement surfaces can be used when surface mounting the camera assembly to a ceiling however, there may be advantages to choose one anchor position over another. For example, for a short run of conduit (e.g. one inch) extended from a wall at the ceiling, there may not be room to allow the camera to swing open to allow access for connections. Choosing a different anchor would allow the camera to swing open. Other ceiling mounts, such as in a corner, also benefit from the selectability of anchor surfaces.

The clip 300 may be inserted by pushing the clip along the anchor feature 114 until the clip abuts with corresponding backstops 116. The abutment with the backstops 116 aligns the engagements tabs 302 for a snap fit into corresponding slot 112 thereby locking the clip 300 in place.

The junction box provides for a single entry access point for conduit 310, As described previously, interior cables and wires of conduit 310 (shown in FIG. 3) may be pulled through one or more of grommets 118 for coupling to electronics, such as the power board beneath cover 214 and through to other electronics of the main camera. The single entry point advantageously minimizes potential environmental impact to the junction box 104 by protecting against entry of water, dust, and other potential hazards.

Figure 7:
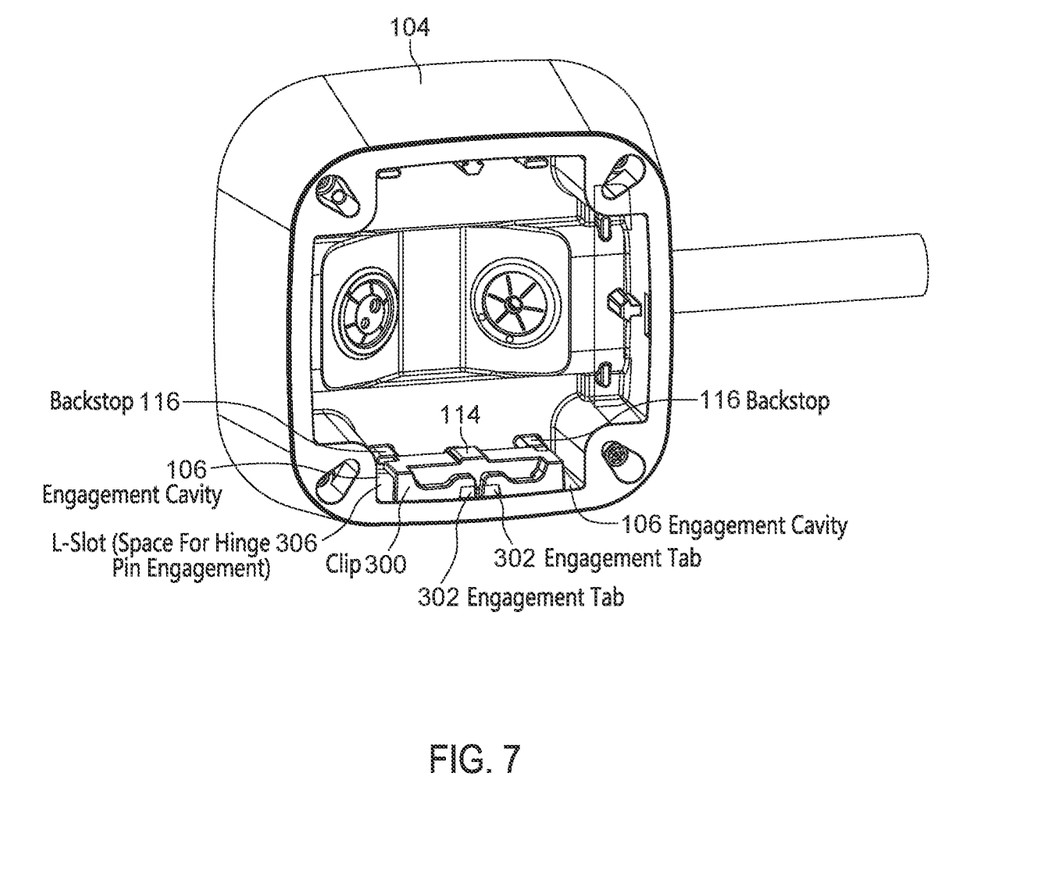
FIG. 7 shows internal components of the junction box with clip inserted in accordance with some embodiments.

FIG. 7 shows internal components of the junction box 104 with clip 300 inserted therein in accordance with some embodiments. Clip 300 is inserted by sliding the tapered access port 304 along the corresponding tapered anchor (112) of the junction box. Backstops 116 limit the travel of the clip 300 so as to align and engage the engagements tabs 302 of the clip into slot 112 of the junction box thereby locking the clip 300 in place. With the clip 300 locked in place, the engagement cavities 106 become formed within the junction box 104. Each engagement cavity 106 is formed by L-slot 306 of the side of clip 300 along with corresponding backstop 116 of the junction box. The engagement cavities 106 provide sufficient spacing to receive and permit travel of the hinge pins (412). The engagement cavities 106 provide for insertion of the hinge pins (412) as will be shown in the next figure. Hence, the backstops 116 provide a dual function of being a backstop for the clip 300 as well as a back wall of the engagement cavity for the hinge pin (412).

Figure 8:
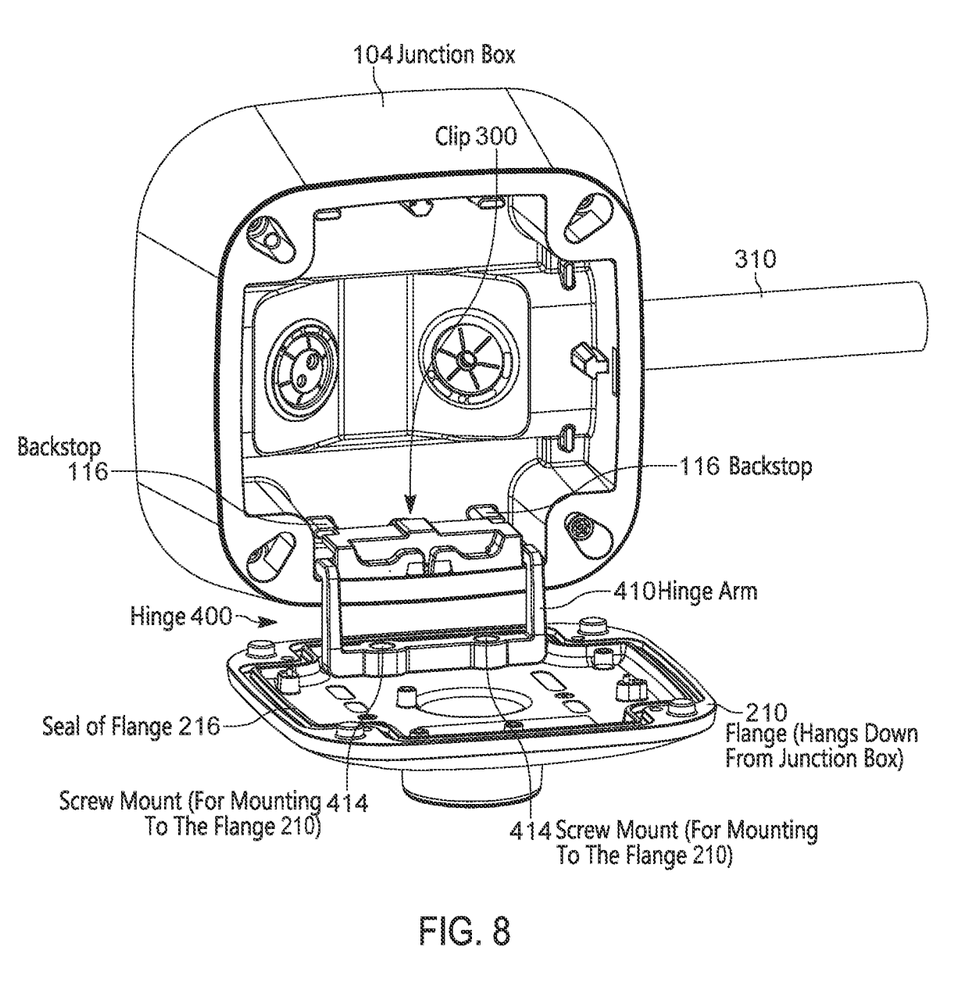
FIG. 8 shows internal components of the junction box with clip locked in place with hinge bracket 400 inserted thereon in accordance with some embodiments.

FIG. 8 shows internal components of the junction box 104 with clip 300 locked in place with hinge bracket 400 inserted thereon in accordance with some embodiments. A partial view of the flange 210 is shown (cover for electronics has been removed for clarity). Again, each engagement cavity 106 is formed of L-slot 306 of the side of clip 300 along with corresponding backstop 116 of the junction box. The engagement cavities 106 provide for insertion and travel of the hinge pins (412) of hinge arms 410. The hinge arms 410 can pivot via hinge pins 412. Thus, the hinge bracket 400 with attached flange 210 can pivotably rotate downward from the junction box 104 thereby providing access to the interior of the junction box 104 and/or access to the flange 210, such as to service. The remainder of the camera assembly (not shown) is able to securely hang from the flange 210 during installment and/or servicing. The flange 210 includes interior perimeter seal 216.

Referring back to FIG. 3, the clip 300 can be unlocked and removed by using the following procedure. With the camera arm hinge screw 232 loosened and the camera in the fully open position, finger pressure is applied to the edge grip 308 of the clip 300 (edge grip 308 seen in view 512 of FIG. 5) toward the center of the junction box 104. This biases the clip 300 toward the center of the junction box 104. This biases the clip 300 toward the center of the junction box removing all clearance between the parts. While holding the clip in this position, the camera arm 230 can be deflected to provide additional leverage to deflect the clip's engagement tabs 302 out of the junction box slot 112. If the hinge screw 232 of the camera arm 230 is not first loosened, the camera cannot be moved into a position to provide the leverage needed to remove the clip 300. Both the finger pressure on the edge grips 308 and the additional leverage of the camera arm are applied to remove the clip. If the clip 300 is not biased toward the center of the junction box, the clip will not disengage from the junction box even with the additional leverage applied. This two factor removal procedure beneficially prevents any unintended disengagement of the clip from the locked position ensuring that the camera will always remain locked to the junction box Accordingly, there has been provided a surface mountable camera that comprises a junction box having an interior compartment formed of a plurality of sidewalls, each of the plurality of side walls having an anchor feature formed thereon. The surface mountable camera further comprises a clip having an access port configured to interchangeably insert onto the anchor feature of each of the plurality of sidewalls. The clip and the junction box form a pair of engagement cavities when the clip is anchored to the junction box. The camera assembly is pivotably coupled to the junction box via a hinged bracket engaged to the engagement cavities.

The embodiments have provided for the clip as a separate insertable and removable piece part, which advantageously enables the junction box to be oriented in multiple positions that accommodate a single surface mount conduit entry. The clip is beneficially insertable and removable from the junction box without the use of additional fasteners or tools. The clip enables the hinge bracket to pivotably engage to the junction box, without interference from mounting screws. The surface mountable camera provides for a plurality of possible mounting positions, each accommodating a hanging camera position.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A surface mountable camera, comprising:
   a mounting assembly (100) comprising:
      a junction box (104) comprising a four-sided interior compartment, wherein three side walls of the four-sided interior compartment each include a slot (112) and an anchor feature (114) corresponding to the slot;
      a clip (300) configured to interchangeably insert onto any of the three sides of the junction box, the clip including an access port (304) formed therein for engaging with the anchor feature, and the clip including first and second engagement tabs (302) for engaging into the slot (112) of the junction box (104); and
      a camera assembly (200) pivotably coupled via a hinged bracket (400) to the clip of the junction box.

2. The surface mountable camera of claim 1, wherein each anchor feature (114) of the junction box (104) is tapered and the access port (304) of the clip (300) is correspondingly tapered.

3. The surface mountable camera of claim 1, wherein the junction box (104) further comprises three pairs of backstop features (116), wherein each pair of backstop features corresponds to a respective anchor feature (114), each pair of backstop features providing abutment for the clip (300) upon insertion of the clip into the junction box.

4. The surface mountable camera of claim 3, wherein the clip (300) is configured to interchangeably anchor to any of the three side walls by:
   pushing the clip along the anchor feature (114) until the clip abuts with the backstops (116), wherein abutment of the clip to the backstops aligns and engages the engagements tabs (302) of the clip (300) into the slot (112) of the junction box (104) thereby locking the clip in place.

5. The surface mountable camera of claim 3, wherein the camera assembly comprises:
   a camera body (250);
   an extension arm (220) coupled to the camera body; and
   a flange (210) coupled to the extension arm, the flange having the hinged bracket (400) mounted thereon, the hinged bracket having first and second hinge arms (410) with hinge pins (412) extending therefrom, the hinge pins being engaged into corresponding engagement cavities (106) formed by the clip and corresponding pair of backstop features.

6. The surface mountable camera of claim 5, wherein the flange comprises a covered power board (214).

7. The surface mountable camera of claim 6, wherein the flange further comprises an interior perimeter seal (216) which provides waterproofing protection to the covered power board (214) when the flange (210) is secured to the junction box (104).

8. The surface mountable camera of claim 1, wherein the clip (300) has first and second sidewalls, each formed of an L-shaped slot (306), each L-shaped slot abutting to a corresponding pair of backstop features (116) located in the junction box (104), wherein each L-shaped slot and corresponding backstop feature forming an engagement cavity (106) within which to engage a hinge pin (412) of the hinge bracket (400).

9. The surface mountable camera of claim 1, wherein the mounting assembly further comprises a back mounting plate (102) for securing the junction box (104) to an external surface.

10. The surface mountable camera of claim 9, wherein the external surface comprises a wall or a ceiling.

11. The surface mountable camera of claim 1, wherein the junction box (104) comprises a single entry point to accommodate a conduit (310).

12. The surface mountable camera of claim 1, wherein the junction box (104) further comprises backstop features (116), and the clip (300) comprises cutout features (316) for abutting with the backstop features (116) upon anchoring of the clip to the junction box via the anchor feature (114).

13. The surface mountable camera of claim 1, wherein the camera assembly (200) is pivotably extendable downward from the junction box (104) via the hinged bracket (400) engagement to the clip (300) anchored within the junction box (104).

14. The surface mountable camera of claim 1, wherein the clip (300) is formed of a unitary piece part.

15. The surface mountable camera of claim 1, wherein the hinged bracket (400) is formed as a unitary piece part.

16. The surface mountable camera of claim 1, wherein the junction box (104) and clip (300) provide three selectable mounting positions, each accommodating a hanging camera position.

17. A surface mountable camera, comprising:
- a junction box comprising an interior compartment having a plurality of side surfaces, each of the plurality of side surfaces having an anchor feature formed thereon;
- a clip having an access port configured to interchangeably insert onto the anchor feature of each of the plurality of side surfaces, the clip and the junction box forming a pair of engagement cavities when the clip is anchored to the junction box; and
- a camera assembly pivotably coupled to the junction box via a hinged bracket engaged to the engagement cavities.

18. The surface mountable camera of claim 17, wherein each anchor feature of the junction box is tapered and the access port of the clip is correspondingly tapered.

19. The surface mountable camera of claim 17, wherein the clip (300) is formed of a unitary piece part.

20. The surface mountable camera of claim 17, wherein the hinged bracket (400) is formed as a unitary piece part.

* * * * *